US009523175B2

(12) United States Patent
Fritsche

(10) Patent No.: US 9,523,175 B2
(45) Date of Patent: Dec. 20, 2016

(54) BINDER COMPOSITION AND PATH MATERIAL COMPRISING A BINDER COMPOSITION

(71) Applicant: STONES GESELLSCHAFT FÜR MINERALISCHE BAUSTOFFE GMBH, Rostock (DE)

(72) Inventor: Sven Fritsche, Rostock (DE)

(73) Assignee: Stone Gesellschaft Fuer Mineralische Baustoffe Gmbh, Bentwisch (DE)

( * ) Notice: Subject to any disclaimer, the term of this patent is extended or adjusted under 35 U.S.C. 154(b) by 0 days.

(21) Appl. No.: 14/377,683

(22) PCT Filed: Feb. 8, 2013

(86) PCT No.: PCT/EP2013/052519
§ 371 (c)(1),
(2) Date: Aug. 8, 2014

(87) PCT Pub. No.: WO2013/117684
PCT Pub. Date: Aug. 15, 2013

(65) Prior Publication Data
US 2015/0030391 A1    Jan. 29, 2015

(30) Foreign Application Priority Data
Feb. 9, 2012    (EP) .................................... 12154770

(51) Int. Cl.
*E01C 7/00* (2006.01)
*E01C 7/10* (2006.01)
*C04B 24/38* (2006.01)
*C04B 28/26* (2006.01)
*C04B 111/00* (2006.01)

(52) U.S. Cl.
CPC ................ *E01C 7/10* (2013.01); *C04B 24/38* (2013.01); *C04B 28/26* (2013.01); *C04B 2111/0075* (2013.01); *C04B 2111/00672* (2013.01)

(58) Field of Classification Search
CPC ............ E01C 7/10; C04B 24/38; C04B 28/26; C04B 2111/00672; C04B 2111/0075
USPC ................... 404/17, 31, 74, 75, 76
See application file for complete search history.

(56) References Cited

U.S. PATENT DOCUMENTS

| 4,002,412 | A | * | 1/1977 | Bennett ................. E01C 7/358 404/17 |
| 4,630,963 | A | * | 12/1986 | Wyman .................. C04B 26/16 404/75 |
| 5,405,440 | A | * | 4/1995 | Green .................. C08L 95/005 106/276 |
| 5,494,741 | A | * | 2/1996 | Fekete .................. C04B 26/04 14/73 |
| 2004/0156995 | A1 | | 8/2004 | Komiyama et al. |
| 2005/0056190 | A1 | * | 3/2005 | Nagler, Jr. ............. C04B 28/02 106/804 |

(Continued)

FOREIGN PATENT DOCUMENTS

| CH | 260512 | 3/1949 |
| EP | 1918263 | 5/2008 |

(Continued)

*Primary Examiner* — Raymond W Addie
(74) *Attorney, Agent, or Firm* — Duane Morris LLP; J. Rodman Steele, Jr.; Gregory M. Lefkowitz

(57) ABSTRACT

A binder composition comprising water glass and psyllium, which can be combined with aggregate to form a traffic surface.

20 Claims, 1 Drawing Sheet

(56) References Cited

U.S. PATENT DOCUMENTS

Figure 1:
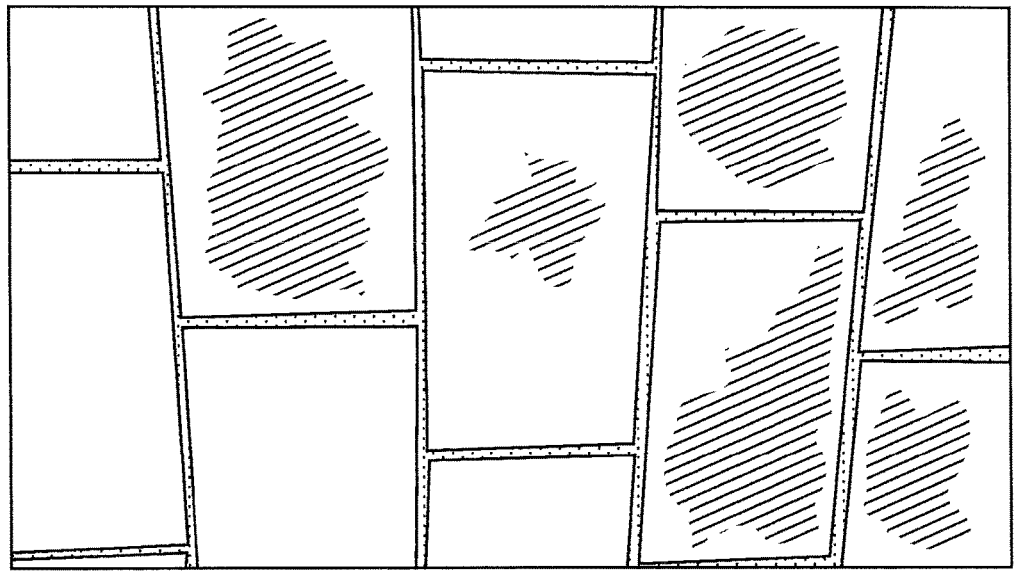

2008/0050176 A1 2/2008 Amarena
2011/0064872 A1 3/2011 Riehm et al.

FOREIGN PATENT DOCUMENTS

GB 2381529 5/2003
WO 2011057605 5/2011

* cited by examiner

US 9,523,175 B2

BINDER COMPOSITION AND PATH MATERIAL COMPRISING A BINDER COMPOSITION

CROSS-REFERENCE TO RELATED APPLICATIONS

This application is a §371 national stage entry of International Application No. PCT/EP2013/052519, filed Feb. 8, 2013, which claims priority to European Patent Application No. 12154770.7 filed Feb. 9, 2012, the entire contents of which are incorporated herein by reference.

BACKGROUND OF THE INVENTION (1) Field of the Invention

The invention relates to a binder composition comprising water glass and an organic hydrocolloid material, in particular psyllium. It relates further to path material comprising such a binder composition and to the use of the binder composition for binding an aggregate. The invention relates further to a method for providing a traffic area or parts of a traffic area, wherein the binder composition is used.

(2) Description of Related Art

Various materials for areas (or parts thereof) which are subjected to pedestrian or vehicular traffic are known. The most widely used materials are unbound materials, such as, for example, gravel, sand, stone chips or crushed sand mixtures. The strength and durability of the path areas or joint fillings produced with these construction materials are low and the susceptibility to erosion is high, weed infestation of these areas and joints increases with the length of their use. These construction materials can be both permeable to water and impermeable to water.

A second group of known construction materials for traffic areas is bound materials. By means of, for example, cement, asphalt or polymers (plastics), lime, etc. or mixtures thereof, materials such as, for example, gravel, sand, stone chips and crushed sand mixtures (aggregates) can be permanently bound.

These construction materials are distinguished negatively by possible cracks and fissures after freeze-thaw cycles and settling, joint-filling products in particular are affected thereby. The sides of the stones delimiting the joints break away from the jointing material. However, these bound construction materials are more durable than the unbound materials. The bound materials are, however, rigid and monolithic, plants (weeds) establish themselves in the cracks that form. These materials are in most cases impermeable to water and seal surfaces.

A third group are the semi-bound construction materials. The semi-bound construction materials are more resistant to erosion than are the unbound materials and are at the same time flexible, resilient, so that, for example, a movement of paving stones relative to one another or settling of the base course (substrate) can be accommodated.

In the known prior art, aggregates are mixed either only with psyllium or with the addition of mineral additives. The disadvantages of this application are known:

Psyllium on its own tends to disintegrate and/or to be washed out by rainwater, plant growth is not reduced. Although the addition of mineral additives increases the erosion resistance as compared with the sole use of psyllium, the strength of the traffic areas is not improved. The additives that bring about erosion resistance often leave a white or grey film on the stone areas filled with the jointing material, the area is soiled. The use is not user-friendly.

Examples of the third group of construction materials are disclosed in WO 2006/029539 A1. A binder mixture of psyllium, calcium hydroxide and sodium carbonate is described therein as a binder composition, and its use as a component of path material is also disclosed. The compositions described in this document exhibit in particular film formation when used as jointing material, and the erosion resistance is in need of improvement.

BRIEF SUMMARY OF THE INVENTION

Accordingly, it was also an object of the present invention to provide a binder material which is user-friendly, has a good binding action and, in particular when used as a jointing material, causes reduced, preferably no soiling of the materials forming the joint boundaries. Furthermore, the binder material is preferably to have good flexibility, self-healing possibilities and/or good erosion resistance. It should preferably also have good permeability to water in the bound state and consist of a considerable proportion of renewable raw material.

The object is achieved by a binder composition comprising
(i) water glass of the general formula (I):

$$M_{2}O \cdot nSiO_{2} \qquad (I)$$

wherein
  M denotes an alkali metal selected from the group consisting of K and Na, and
  n denotes a number from 0.8 to 5, and
(ii) an organic hydrocolloid material, in particular psyllium.

A binder composition within the meaning of this text is capable of imparting to the materials that are to be bound a stronger cohesion than would be achieved by the materials under the same conditions without the corresponding binder composition.

An aggregate within the meaning of this text is a collection of particles (such as, for example, stone fragments, fragments of minerals, crystals or similar materials, in particular of sand, crushed stone, gravel, stone chips and slag.

An organic hydrocolloid material within the meaning of this text is a material that swells upon contact with water, water being bonded to the hydrocolloid material or incorporated therein. A gel frequently forms thereby. As a result of this swelling process, gaps between materials that are to be bound, such as, for example, the particles of an aggregate, are filled. It is preferred within the meaning of the following invention that the hydrocolloid material cures after contact with water and optionally in combination with the water glass upon drying, so that the particles that are to be bound are bound together.

DETAILED DESCRIPTION OF THE INVENTION

It has been found, surprisingly, that the combination of organic hydrocolloid material with water glass provides a binder material which, in the hardened state, has high flexibility, provides good strength and even has a self-healing ability. This self-healing ability is distinguished by the fact that, for example when exposed to large amounts of water, such as, for example, in the case of rain, some of the bonds in the binder material are loosened after curing and are re-established again later, in particular upon drying of the binder material. The binder material is thus able to react flexibly to movements of the bound material, or of the material to be bound, even after curing, and the bound areas remain largely intact even after exposure to large amounts of water. It has further been found that, by the addition of water glass, the strength of the hardened binder composition is increased significantly and, in addition, the washing out of the organic hydrocolloid material upon exposure to water is reduced significantly. Nevertheless, sufficient permeability of the binder material to water is retained.

Without being bound to one theory, the water glass in the binder composition according to the invention acts in particular by providing improved inner crosslinking of the binder composition according to the invention upon curing. This leads to increased stability, without undesirable irreversible solidification taking place. This can be achieved inter alia as a result of the fact that the water glass provides alkali metal ions which assist the linking of intramolecular bonds in the organic hydrocolloid material upon swelling (that is to say the absorption of water). In addition, when reacted with water, water glass forms not only individual monosilicate ions but also cyclic and intermolecularly spatially crosslinked polysilicate ions, so that an additional (binding) structure is provided.

It is preferred according to the invention that the binder composition according to the invention is a solid mixture, in particular pulverulent.

A particularly preferred hydrocolloid organic material is psyllium.

Psyllium within the meaning of this text is a plant material obtained from plantain (*Plantago*), sub-genus Psyllium. It is to be understood as being in particular material from the epidermis and the adjacent layers (seed coats) of the dried ripe seeds of the plant. It is preferably comminuted, in particular ground plant material. Particularly preferably, psyllium originates from [*Plantago ovata* (Indian fleawort). Such a preferred material is obtainable, for example, under the trade name Blond Psyllium or Blond Psyllium Husk. Further trade names are Indian Psyllium or Isphagula. The Indian fleawort is distinguished from fleaworts of other origins (e.g. Spain, France there *Plantago afra*) by its high swelling ability, that is to say the ability to absorb and bind water. The epidermis of the European fleawort species contains approximately from 10 to 12% lubricants (in particular arabinoxylans) with a swelling index of at least 10. The seed coats of the Indian fleawort contain approximately from 20 to 30% lubricants. In the seed itself, oil, cellulose, proteins and iridoglycosides (inter alia aucubin) can occur. The Indian fleawort seed coats consist of the outermost mucilaginous layer of the seed coat, that is to say the husk epidermis, and the underlying layers of the seed coat. Most particularly preferably, psyllium within the meaning of this application is ground powder from the seed coat of the Indian fleawort with a swelling index of $\geq 20$, preferably $\geq 40$, more preferably $\geq 60$, in particular from 60 to 90.

For the most particularly preferred psyllium, a purity of from 85 to 99% and/or a grinding fineness of from 40 to 200 mesh is preferred.

However, psyllium within the meaning of this text also includes rubbed (ground) material of the corresponding plants from the whole seed. According to the description given above, psyllium is an organic binder having film-forming properties. On contact with water, psyllium forms a mucilaginous gel which substantially binds together the particles of the materials that are to be bound. This is preferably achieved by allowing the mixture to become solid for a certain time following contact with water. After drying, psyllium becomes solid and forms a flexible and resilient bond among and between the particles that are to be bound. This bond is, however, a physical bond, so that there are self-healing possibilities (see below). Preference is given to a binder composition according to the invention in which the water glass is potassium silicate. Potassium silicate has been shown to be particularly effective within the meaning of the above-described object.

The fact that water glass, in particular potassium silicate, is present in the binder composition according to the invention has a further positive effect: the pH value of the binder composition is increased, so that plant growth is effectively prevented even after curing.

Particular preference is given to a binder composition according to the invention that additionally also comprises sodium carbonate. Anhydrous sodium carbonate (calcined, anhydrous soda) is particularly preferred in this context. In principle, however, it is also conceivable to use sodium carbonate with water of crystallisation, such as, for example, with one molecule, 7 molecules or 10 molecules of water of crystallisation per molecule of sodium carbonate.

The use of sodium carbonate in the binder composition according to the invention has a number of advantageous effects. On the one hand—without being bound to one theory—the intermolecular interactions within the binder material (of the hardened binder composition) are assisted by sodium carbonate. In addition, as a result of the addition and integration of the carbonate or hydrogen carbonate ions from the soda into the network structure of psyllium and water glass that forms, a further alkaline depot is made available, which ensures that a lowering of the pH value by washing out or by reaction with carbon dioxide from the air is substantially retarded.

Because the swellability of the organic hydrocolloid material, in particular of the psyllium, on contact with the water is still present even after curing, the presence of sodium carbonate—again without being bound to one theory—effects a moderation of the swelling process, because sodium carbonate can in turn be hygroscopic. It is thus possible to prevent too rapid a swelling process from occurring.

As already mentioned above, sodium carbonate brings about an increase of the pH value, which can exert herbicidal and fungicidal action. This has the advantage not only that the binder materials are not populated by plants/fungi, which can mean visual impairment, but also the advantage that these organisms, in particular when they are fungi, can effect or accelerate the degradation of the organic hydrocolloid material. Such a degradation would reduce the binding action of the binder composition or the binder material as the hardened binder composition.

It can be preferred within the meaning of the invention to use a sterilised or at least germ-reduced organic hydrocolloid material in the binder composition according to the invention. Germ-reduced means that the number of germs is $\leq 5000$ CFU/g, preferably $\leq 3000$ CFU/g, more preferably $\leq 1700$ CFU/g, where CFU=colony-forming unit.

Germ reduction brings about a generally improved acceptance of the material on the market, but also has the technical effect that germs can in principle also be involved in the degradation of the materials of the binder composition, in this case in particular of the organic hydrocolloid material.

In analogy to the above, it can be preferred according to the invention that the binder composition according to the invention comprises (further) herbicidal and/or fungicidal active ingredients.

Preference is given according to the invention to a binder composition according to the invention wherein n in formula I is a number from 2.0 to 4.0, preferably from 2.5 to 3.5 and particularly preferably 3. Accordingly, potassium silicate of the formula $K_2O*3\ SiO_2$ is particularly preferably present as the water glass in the binder composition according to the invention.

Preference is given to a binder composition according to the invention wherein the weight ratio of water glass to organic hydrocolloid material is from 1:0.1 to 1:10, preferably from 1:0.5 to 1:3, particularly preferably from 1:1 to 1:2.

The described ratios result in particularly flexible and particularly solid bonds in the hardened binder composition, sufficient permeability to water still being present.

Further preference is given according to the invention to an above-described binder composition according to the invention wherein sodium carbonate is present and the weight ratio of sodium carbonate to organic hydrocolloid material, in particular psyllium, is from 1:0.1 to 1:10, preferably from 1:0.5 to 1:3, particularly preferably from 1:1 to 1:2, and/or the weight ratio of $Na_2CO_3$ to water glass is from 1:0.1 to 1:10, preferably from 1:0.5 to 1:5, particularly preferably from 1:0.8 to 1:1.2.

In the preferred relative proportions, sodium carbonate can effect particularly well its above-described positive properties. Any water of crystallisation present is not included in the mass of sodium carbonate.

Further preference is given according to the invention to a binder composition according to the invention wherein the pH value of the composition is from 5.0 to 13.5, preferably from 9.0 to 12.0.

The pH value is measured as follows: A sample amount of 20 g of binder composition is introduced by means of a spoon into a measuring vessel having a capacity of 100 ml. The measuring vessel is made up with 40 ml of water. Binder and water are stirred with a spoon. Then a waiting period of 5 minutes is observed. After 5 minutes, the glass electrode of the measuring vessel is immersed into the sample by means of a calibrated pH meter. After one minute, the pH value is measured.

It can be understood that, for the reasons mentioned above, high pH values, that is to say pH values greater than 10, are particularly preferred.

The invention provides a path material comprising a binder composition according to the invention and an aggregate, or a path material consisting of the mentioned components.

Path material within the meaning of the present text is material which can form at least part of the surface of an area that is subjected to traffic. Areas subjected to traffic are areas on which pedestrian traffic or vehicular traffic moves. Particular mention may be made of footpaths, paths, roads, pavements, terraces or the like.

For the path material according to the invention, the person skilled in the art will adapt the relative proportions of aggregate and binder material and also the material of the aggregate to the particular purpose.

Preference is given according to the invention to a path material according to the invention wherein the weight ratio of aggregate to the total mass of binder material according to any one of claims 1 to 9 is from 80:20 to 99.9:0.1, preferably from 90:10 to 99.6:0.4, more preferably from 95.0:5 to 99.0.

In these weight ratios, the path material according to the invention exhibits particularly good properties within the meaning of the above-described object.

Further preference is given to a path material according to the invention wherein the path material has a water content of from 0 to 20 wt. %, preferably from 0 to 10 wt. %, based on the total mass of the path material.

It is to be noted that the path material can naturally have a higher (bound) water content after application because the organic hydrocolloid material and also the water glass are able to bind water during curing.

Preference can be given according to the invention to a path material wherein the aggregate consists of ≥95 wt. %, preferably ≥99 wt. %, based on the total mass of the aggregate, of crushed sand or natural sand of a grain size mixture of from 0.001 to 2 mm.

This path material is particularly suitable as a material which is to form part of an area, which is subjected to traffic, between paving stones (joints). Such a path material as jointing material preferably comprises crushed sand mixtures as the aggregate. Crushed sand has fewer rounded particles.

The particle size is determined by grading curves, preferably analogously to or preferably exactly in accordance with DIN EN 18123.

A further path material that is preferred according to the invention is a path material wherein the aggregate consists of ≥95%, preferably ≥99.5 wt. %, based on the total mass of the aggregate, of a crushed sand/stone chips mixture of a grain size mixture of from 0.001 to 8 mm or from 0.001 to 5 mm or from 0.001 to 16 mm.

This path material according to the invention is particularly suitable for the production of areas, subjected to traffic, which do not have paving elements, such as, for example, paths or plazas.

The invention also provides the use of a binder composition according to the invention for binding an aggregate.

As already described above, a particularly good property window as regards the achievable bond is possible with the binder composition according to the invention.

The invention further provides a method for providing a traffic area or parts of a traffic area, comprising the steps:
a) providing a binder composition according to the invention or a path material according to the invention;
b) applying the binder composition or the path material to the region or part of the region that is to form the traffic area;
c) compacting the material applied in step b); and
d) optionally wetting the applied material.

It is possible in step b) that the application is carried out in such a manner that only joints between paving elements, such as, for example, paving stones, are filled.

It is preferred that, after compaction in step c), the surfaces of the paving elements, for example paving stones, are cleaned of residues of the applied material with a leaf blower, broom or suitable device.

It is preferred that in step d) wetting includes the whole of the jointing material, so that the materials to be bound adhere relatively uniformly to one another through the binder material. It is preferred to ensure that watering is carried out in such a manner that the whole of the binder material actually comes into contact with water, because it can occur that water is bound only at the surface and the penetration of the water into deeper regions is at least retarded considerably. The reason for this is the swelling of the hydrocolloid material. After wetting, a waiting period of from 5 to 10 minutes is preferably to be observed, and then the stone surfaces are to be cleaned of any remaining residues and the jointing material is to be watered thoroughly with a strong jet.

It is further preferred that, if no paving elements are used (the path covering consists entirely of path material according to the invention), wetting in step d) includes the entire path material so that the materials to be bound adhere to one another relatively uniformly through the binder material. It is preferred to ensure that watering is carried out in such a manner that the whole of the binder material actually comes into contact with water, because it can occur that water is bound only at the surface and the penetration of the water into deeper regions is at least retarded considerably. The reason for this is the swelling of the hydrocolloid material. As soon as the covering layer has half dried again and is thus earth-moist (depending on atmospheric conditions this takes from 4 to 48 hours), post-compaction is preferably carried out with a static roller or tandem roller without vibration.

After thorough wetting in the method according to the invention, it is preferred to allow the thoroughly wetted mixture (largely) to dry again, as a result of which it solidifies (hardens).

The effect of the invention is shown hereinbelow by examples.

EXAMPLE 1

Erosion Resistance Test

It is known from the prior art (WO 2006/029539 A1) that a path material of the following composition is superior in terms of erosion resistance to a mixture of an aggregate and only psyllium as binder material. The mixture known from the prior art has the following composition (sample A):
Aggregate: 97.2 wt. % grain size 0-2 mm
Psyllium: 1.4 wt. %
Calcium hydroxide: 0.8 wt. %
Sodium carbonate (soda): 0.6 wt. %
(path material, in particular for jointing, from the prior art)

The above-described sample A was compared with a path material comprising the binder composition according to the invention. The composition was as follows (sample B):
Aggregate: 96.6 wt. % grain size 0-2 mm
Psyllium: 1.4 wt. %
Potassium silicate $K_2O \cdot 3\ SiO_2$) 1.0 wt. %
Sodium carbonate: 1.0 wt. %
(path material according to the invention).

The erosion resistance test was carried out using a laboratory rainfall simulator from TU Freiberg.

The laboratory rainfall simulator consists of a large metal trough in which there has been punched a plurality of openings. The trough is arranged above the samples, which are located in a large tank or basin with an outlet. Water that is introduced into the trough trickles through the openings onto the samples as simulated rainfall. The simulator realistically simulates rainfall for a specific period of time.

Each of the tests lasted 3 hours, and three test troughs were used for each product. The material to be tested (sample A and sample B) was used as jointing material, that is to say as a joint between adjacent stones. The joint dimensions and the results are listed in Table 1 below.

TABLE 1

Test date: 10 Jan. 2012

| Test conditions: | |
|---|---|
| Average joint dimensions (Length * Width * Depth) | 35.5 cm * 4.0 cm * 3.0 cm |
| Rainfall height | 131 cm |
| Rainfall intensity per minute | 2.292 mm per min or: 2.292 l/m² per min |
| Rainfall time | 3 hours |
| Gradient | 2.5% |
| Drying temperature | 30° C. |

| Joint name | Total weight | Weight after rainfall | Material removed by erosion in grams | Material removed by erosion in percent |
|---|---|---|---|---|
| Sample A/Prior art mixture: | | | | |
| Joint 2 a | 673.97 g | 635.21 g | 38.76 g | 5.75% |
| Joint 2 b | 693.84 g | 654.70 g | 39.14 g | 5.64% |
| Joint 2 c | 686.75 g | 649.19 g | 37.56 g | 5.47% |
| Average | 684.85 g | 646.37 g | 38.48 g | 5.62% |
| Sample B/Form according to the invention: | | | | |
| Joint 3 a | 632.99 g | 607.28 g | 25.71 g | 4.06% |
| Joint 3 b | 657.92 g | 631.14 g | 26.78 g | 4.07% |
| Joint 3 c | 670.68 g | 645.81 g | 24.87 g | 3.71% |
| Average | 653.86 g | 628.08 g | 25.78 g | 3.94% |

EXAMPLE 2

Observation of Resilience

The two compositions from Example 1 (sample A, prior art, sample B, according to the invention) were placed in Petri dishes in order to evaluate their consistency after mixing with water and their reaction on contact with air and drying. 20 g of each sample were introduced by means of a spoon into a Petri dish having a diameter of 5 cm and a height of 5 mm. The samples were sprayed with water from a round flask with an atomiser (30 ml volume), and the contents were applied to the samples by means of several bursts of spray. The samples were then dried at 30 degrees.

It was observed that the composition of sample B according to the invention subsequently had a more homogeneous and more resilient consistency than did sample A (prior art).

The following observation was made in subsequent tests after wetting several times with the same amount of water from a spray bottle and subsequent drying:

It was found in a test after wetting the samples in a Petri dish that the form according to the invention remained stable when pressed with a thumb, while the mixture of psyllium, lime and calcined soda crumbled in the Petri dish when pressed with a thumb (same pressure). (the mixture from the prior art).

In both cases, the pH values of the mixtures in the Petri dish were measured. The pH value of the form according to the invention was 11.9, and the pH value of the mixture from the prior art was 13.2. It must be concluded that potassium silicate and psyllium are evidently able to enter into a more homogeneous and firmer bond than is the mixture of the prior art.

EXAMPLE 3

Cleaning Test of the Stone Surface

Using the composition of sample B (according to the invention) from Example 1, the property of producing film and discolouration on stone surfaces was studied in a practical test. The composition was again compared with sample A from Example 1. Both samples were applied to a paving stone surface and inserted as jointing material under the same insertion conditions and with the same steps. The procedure was as follows: Two 5 m² stone areas of paving bricks were laid and jointed with a dry stone surface. To that end, the samples (jointing material) were spread over the stone surface and distributed evenly by means of a broom. The stone surfaces were then compressed with a vibratory plate and blown and cleaned with a leaf blower. The stone area was then watered carefully with a hosepipe and watering with a fine spray head, and the binder was activated. After a waiting time of 10 minutes, the stone surface and the joints were watered with a powerful jet using a spray head. Watering and cleaning with a powerful jet took 15 minutes per area. The air temperature was 19 degrees.

Considering the conventional procedure for cleaning the stone surface (leaf blower and water jet as described above), two completely different appearances were found after drying of the stone surface.

Area A (with sample A as the jointing material) (FIG. 1) had visible white residues, which were incorporated into the pores of the stone surface. The inclusions could not be removed even by the repeated use of brushes and water and appeared to leave behind permanent soiling.

Figure 2:
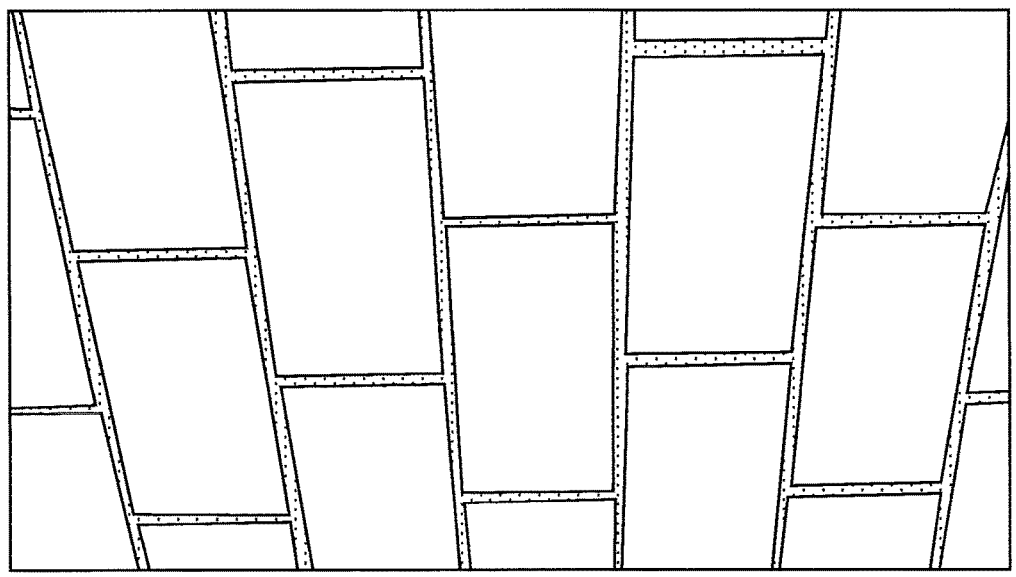

Area B (with sample B as the jointing material) (FIG. 2) did not have any permanently visible residues, slight traces of a pale grey residue were found in the stone pores. These could easily be removed with a brush and water. The result was thus problem-free cleaning.

The permanent soiling of the surface of stone area A was presumably caused by the incorporation of calcium from the mixture of the known prior art.

EXAMPLE 4

Comparison of Psyllium with Tragacanth as Hydrocolloid Material

Two different path materials, sample A (according to the invention, corresponds to sample B from Example 1) and sample B (contains tragacanth in the same amount as sample A contains psyllium), were placed in Petri dishes in order to evaluate their consistency after drying. 20 g of each sample were introduced by means of a spoon into a Petri dish having a diameter of 5 cm and a height of 5 mm. The samples were sprayed with water from a round flask with an atomiser (30 ml volume) and the contents were applied to the samples by means of several bursts of spray. The samples were then dried at 30 degrees.

It was observed that the composition of sample A according to the invention subsequently had a more homogeneous and more resilient consistency than did sample B.

The following observation was made in subsequent tests after repeated wetting with the same amount of water from a spray bottle and subsequent drying:

It was found in a test after wetting of the samples in a Petri dish that the form according to the invention (sample A) remained stable when pressed with a thumb, while the binder composition of sample B (tragacanth as hydrocolloid material) crumbled in the Petri dish when pressed with a thumb (same pressure).

It must be concluded that potassium silicate and psyllium (as hydrocolloid material) are evidently able to enter into a more homogeneous and firmer bond than is the same mixture with tragacanth as the hydrocolloid.

The invention claimed is:

1. Binder composition comprising
   (i) water glass of the general formula (I):
   $$M_2O*nSiO_2 \quad (I)$$
   wherein
   M denotes an alkali metal selected from the group consisting of K and Na, and
   n denotes a number from 0.8 to 5, and
   (ii) psyllium, wherein the weight ratio of water glass to psyllium is from 1:0.1 to 1:10.

2. The binder composition according to claim 1, wherein the weight ratio of water glass to psyllium is from 1:0.5 to 1:3.

3. The binder composition according to claim 1, further comprising $Na_2CO_3$.

4. Binder composition according to claim 3, wherein the $Na_2CO_3$ is anhydrous or with water of crystallization.

5. Binder composition according to claim 1, wherein M in formula (I) denotes K.

6. Binder composition according to claim 1, wherein n in formula (I) is a number from 2.0 to 4.0.

7. Binder composition according to claim 1, wherein $Na_2CO_3$ is present and the weight ratio of $Na_2CO_3$ to psyllium is from 1:0.1 to 1:10 and/or the weight ratio of $Na_2CO_3$ to water glass is from 1:0.1 to 1:10.

8. Binder composition according to claim 1, wherein the pH value of the composition is from 5.0 to 13.5.

9. Method of binding an aggregate, comprising
   mixing aggregate with a binder composition according to claim 1, and
   curing the binder composition.

10. Binder composition according to claim 1, wherein the pH value of the composition is from 9.0 to 13.5.

11. Path material comprising a binder composition according to claim 1, and an aggregate.

12. Path material according to claim 11, wherein the weight ratio of aggregate to the total mass of binder material is from 80:20 to 99.9:0.1.

13. Path material according to claim 11, wherein the path material has a water content of from 0 to 20 wt. %, based on the total mass of the path material.

14. Path material according to claim 11, wherein the aggregate consists of ≥95 wt %, based on the total mass of the aggregate, of crushed sand or natural sand of a grain size mixture of from 0.001 to 2 mm.

15. Path material according to claim 11, wherein the aggregate consists of ≥95 wt %, based on the total mass of the aggregate, of a crushed sand/stone chips mixture of a grain size mixture of from 0.001 to 8 mm.

16. Path material according to claim 11, wherein the weight ratio of aggregate to the total mass of binder material is from 90:10 to 99.6:04.

17. Path material according to claim 11, wherein the aggregate consists of ≥99 wt. %, based on the total mass of the aggregate, of crushed sand or natural sand of a grain size mixture of from 0.001 to 2 mm.

18. Method for providing a traffic area or parts of a traffic area, comprising the steps:
    a) providing a binder composition according to claim 1,
    b) applying the binder composition or the path material to the region or part of the region that is to form the traffic area, and
    c) compacting the material applied in step b).

19. Method of claim 18, wherein the binder composition further comprises an aggregate.

20. The method of claim 18 further comprising:
    d) wetting the applied material.

* * * * *

UNITED STATES PATENT AND TRADEMARK OFFICE
CERTIFICATE OF CORRECTION

PATENT NO. : 9,523,175 B2
APPLICATION NO. : 14/377683
DATED : December 20, 2016
INVENTOR(S) : Sven Fritsche It is certified that error appears in the above-identified patent and that said Letters Patent is hereby corrected as shown below:

On the Title Page

Item (73) please replace Assignee: "STONES GESELLSCHAFT FÜR MINERALISCHE BAUSTOFFE GMBH, BENTWISCH, GERMANY" with "ECO SCIENCE GMBH, BENTWISCH, GERMANY".

Signed and Sealed this
Third Day of April, 2018

Andrei Iancu
*Director of the United States Patent and Trademark Office*